US009997797B2

(12) United States Patent
Sato et al.

(10) Patent No.: US 9,997,797 B2
(45) Date of Patent: Jun. 12, 2018

(54) ELECTROCHEMICAL REACTION UNIT AND FUEL CELL STACK

(71) Applicant: NGK SPARK PLUG CO., LTD., Nagoya-shi, Aichi (JP)

(72) Inventors: Yoshiaki Sato, Komaki (JP); Makoto Kuribayashi, Ichinomiya (JP); Tomoki Murata, Komaki (JP); Takahiro Masumoto, Komaki (JP); Tomo-o Tanaka, Kitanagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 33 days.

(21) Appl. No.: 15/184,359

(22) Filed: Jun. 16, 2016

(65) Prior Publication Data

US 2016/0372758 A1 Dec. 22, 2016

(30) Foreign Application Priority Data

Jun. 19, 2015 (JP) ................................. 2015-123586

(51) Int. Cl.
| | |
|---|---|
| *H01M 4/86* | (2006.01) |
| *H01M 8/2457* | (2016.01) |
| *H01M 8/0656* | (2016.01) |
| *H01M 8/1231* | (2016.01) |
| *H01M 8/1213* | (2016.01) |
| *H01M 8/2425* | (2016.01) |

(Continued)

(52) U.S. Cl.
CPC ............. *H01M 8/1231* (2016.02); *C25B 1/12* (2013.01); *C25B 9/08* (2013.01); *H01M 8/0228* (2013.01); *H01M 8/0236* (2013.01); *H01M 8/2425* (2013.01); *H01M 8/021* (2013.01); *H01M 2008/1293* (2013.01); *H01M 2300/0074* (2013.01); *Y02E 60/366* (2013.01)

(58) Field of Classification Search
CPC .... H01M 4/86; H01M 4/8668; H01M 8/2457; H01M 8/0656; H01M 8/1231; H01M 8/1213; H01M 8/2425; H01M 16/00; H01M 16/003; C25B 1/12; C25B 9/08
See application file for complete search history.

(56) References Cited

U.S. PATENT DOCUMENTS

2011/0111327 A1\* 5/2011 Ohmori ................. H01M 8/021
429/520

FOREIGN PATENT DOCUMENTS

| JP | 2011-99159 A | 5/2011 | |
|---|---|---|---|
| JP | 2013-30358 A | 2/2013 | |
| JP | 2013030358 A | \* 2/2013 | .............. H01M 8/02 |

\* cited by examiner

*Primary Examiner* — Karie O'Neill Apicella
(74) *Attorney, Agent, or Firm* — Sughrue Mion, PLLC

(57) ABSTRACT

An electrochemical reaction unit which includes a unit cell including an electrolyte layer, a cathode, and an anode facing each other in a first direction; a current collector disposed on a cathode side of the unit cell; and an electrically conductive porous bonding layer. A bonding region contains a block portion and an electrical conductivity securing portion. The block portion has a pore having a diameter that is 20% or more than the thickness of the bonding region in the first direction. The block portion extends inward from one of opposite ends in a second direction orthogonal to the first direction of the bonding region, and reaches and contains the pore satisfying the pore requirement. The electrical conductivity securing portion is located toward the other end of the bonding region and has a smaller average diameter of pores than the block portion.

8 Claims, 10 Drawing Sheets

(51) Int. Cl.
*H01M 16/00* (2006.01)
*C25B 1/12* (2006.01)
*C25B 9/08* (2006.01)
*H01M 8/0228* (2016.01)
*H01M 8/0236* (2016.01)
*H01M 8/124* (2016.01)
*H01M 8/021* (2016.01)

ELECTROCHEMICAL REACTION UNIT AND FUEL CELL STACK

BACKGROUND OF THE INVENTION

1. Field of the Invention

The present invention relates to an electrochemical reaction unit.

2. Description of the Related Art

A known type of a fuel cell for generating electricity by utilizing an electrochemical reaction between hydrogen and oxygen is a solid oxide fuel cell (hereinafter, also called "SOFC") which has electrolyte layers containing a solid oxide. A fuel cell electricity generation unit (hereinafter, also called an "electricity generation unit"), which is the smallest electricity generation unit of a SOFC, has a unit cell which includes an electrolyte layer and a mutually facing cathode and anode with the electrolyte layer intervening therebetween. Further, electrically conductive current collectors are disposed respectively on a cathode side and on an anode side of the unit cell and adapted to collect electricity generated by the unit cell. The cathode and the corresponding current collector are electrically connected and bonded together by an electrically conductive bonding layer. The bonding layer is a porous layer having a plurality of pores formed therein.

[Patent Document 1] Japanese Patent Application Laid-Open (kokai) No. 2011-99159

3. Problems to be Solved by the Invention

In the conventional structure mentioned above, due to, for example, a difference in the coefficient of thermal expansion between members such as the cathode and the current collectors, stress (e.g., tensile stress) is generated in the bonding layer. As a result, a crack may generate, progressing from the outer surface of the bonding layer to the interior of the bonding layer. In the case where the bonding layer is a porous layer as in the above structure, since the generated stress can be diffused by means of pores, a crack initiating in the outer surface can be prevented from progressing to the interior of the bonding layer. Further, the greater the average diameter of pores in the bonding layer, the higher the stress dispersibility provided by the pores, and thus the progress of a crack can be restrained more reliably.

However, as described below, increasing the diameters of pores in the bonding layer for restraining the progress of a crack may deteriorate electrical conductivity between the current collector and the cathode. For example, in the vicinity of an interface between the bonding layer and the cathode, a plurality of contact portions where the bonding layer and the cathode are in contact with each other line up along the interface with a pore intervening therebetween. The greater the average diameter of pores in the bonding layer, the wider the widths of the contact portions along the interface, and the wider the intervals between the contact portions become. As a result, since current which flows per unit area of each contact portion increases, Joule heat generated per unit area of each contact portion increases. Also, even in the case where one pore having a relatively large diameter exists in the vicinity of the interface between the bonding layer and the cathode, since current which flows per unit area of a contact portion located in the periphery of the pore increases, Joule heat generated per unit area of the contact portion increases. That is, if the average diameter of pores in the bonding layer is large or if a pore having a relatively large diameter exists locally, current concentration will occur in which current flows between the bonding layer and the cathode in a locally concentrated manner to thereby generate a high Joule heat and thus thermally deteriorate the current collector, the cathode, etc. As a result, electrical conductivity between the current collector and the cathode may deteriorate. Such current concentration stemming from the diameters of pores could occur in the vicinity of the interface between the bonding layer and the current collector.

Such a problem is common with an electrolysis cell unit, which is the smallest unit of a solid oxide electrolysis cell (hereinafter, also called "SOEC") for generating hydrogen by electrolysis of water. As used herein, an electricity generation unit and an electrolysis cell unit are collectively called an electrochemical reaction unit.

SUMMARY OF THE INVENTION

The present invention was made to address the above problem, and an object thereof is to restrain the progress of a crack in a bonding layer and to secure electrical conductivity between the bonding layer and an object member of bonding.

The above object has been achieved by providing (1) an electrochemical reaction unit which comprises a unit cell including an electrolyte layer containing a solid oxide, and a cathode and an anode which face each other in a first direction with the electrolyte layer intervening therebetween; a current collector disposed on a cathode side of the unit cell; and an electrically conductive porous bonding layer which bonds the current collector and the cathode together. In at least one section of the bonding layer in parallel with the first direction, a bonding region located between the current collector and the cathode contains a block portion and an electrical conductivity securing portion. The block portion is a portion in which at least one pore satisfying a pore requirement of a diameter in the first direction being 20% or more than a thickness of the bonding region in the first direction is formed on at least a bonding region side of an interface between the cathode and the bonding region or on a bonding region side of an interface between the current collector and the bonding region. The block portion extends inward from one of opposite ends in a second direction orthogonal to the first direction of the bonding region, whichever is closer to the pore satisfying the pore requirement, and reaches and includes the pore satisfying the pore requirement. The electrical conductivity securing portion is located toward the other end of the bonding region with respect to the block portion and is smaller in average diameter of pores than the block portion.

According to the electrochemical reaction unit, in at least one section of the bonding layer in parallel with the first direction, the bonding region located between the current collector and the cathode contains the block portion and the electrical conductivity securing portion. The block portion is a portion in which at least one pore satisfying the pore requirement of a diameter in the first direction being 20% or more than the thickness of the bonding region in the first direction is formed at least on the bonding region side of the interface between the cathode and the bonding region or on the bonding region side of the interface between the current collector and the bonding region. The block portion extends inward from one of opposite ends in the second direction orthogonal to the first direction of the bonding region, whichever is closer to the pore satisfying the pore requirement, and reaches and includes the pore satisfying the pore requirement. The electrical conductivity securing portion is located toward the other end of the bonding region with respect to the block portion and is smaller in average diameter of pores than the block portion.

A pore which satisfies the pore requirement and is contained in the block portion can restrain the progress, to the electrical conductivity securing portion, of a crack generated as a result of a difference in the coefficient of thermal expansion between component members of the electrochemical reaction unit. Also, since the electrical conductivity securing portion is smaller in average diameter of pores than the block portion, local current concentration in the flow of current between the bonding layer and an object member of bonding (the cathode or the current collector) can be restrained. That is, while the progress of a crack is restrained, electrical conductivity can be secured by restraining local current concentration in the flow of current between the bonding layer and an object member of bonding.

In a preferred embodiment (2) of the electrochemical reaction unit (1) above, in the at least one section, an overall width in the second direction of the block portions is less than ½ a width in the second direction of the bonding region.

According to the electrochemical reaction unit (2), as compared with the case where the overall width in the second direction of the block portions is equal to or greater than ½ the width in the second direction of the boding region, local current concentration in the flow of current between the bonding layer and an object member of bonding can be restrained.

In another preferred embodiment (3) of the electrochemical reaction unit (1) or (2) above, the current collector has a plurality of protrusions protruding toward the cathode, and the cathode and at least half of the plurality of protrusions are bonded together by the bonding layer.

According to the electrochemical reaction unit (3), as compared with the case where the cathode and less than half the plurality of protrusions are bonded together by the bonding layer which contains the block portion and the electrical conductivity securing portion, while the progress of a crack is restrained, local current concentration in the flow of current between the bonding layer and an object member of bonding can be restrained.

In yet another preferred embodiment (4) of the electrochemical reaction unit (1) or (2) above, the current collector has a plurality of protrusions protruding toward the cathode, and the cathode and all of the plurality of protrusions are bonded together by the bonding layer.

According to the electrochemical unit (4), as compared with the case where the cathode and a portion of the plurality of protrusions are bonded together by the bonding layer which contains the block portion and the electrical conductivity securing portion, while the progress of a crack is restrained, local current concentration in the flow of current between the bonding layer and an object member of bonding can be restrained.

In yet another preferred embodiment (5), the electrochemical reaction unit of any (1) to (4) above may be configured such that, in the at least one section, the block portion is formed on each of opposite sides in the second direction of the electrical conductivity securing portion.

According to the electrochemical reaction unit (5), since the block portion is formed on both opposite sides in the second direction of the electrical conductivity securing portion, the progress of a crack in the electrical conductivity securing portion can be restrained more reliably.

In yet another preferred embodiment of (6) of the electrochemical reaction unit of any of (1) to (5) above, the bonding layer is formed of a spinel oxide.

According to the electrochemical reaction unit (6), since the bonding layer is formed of a spinel oxide having high electrical conductivity, local current concentration in the flow of current between the bonding layer and an object member of bonding can be restrained more effectively.

The technique disclosed in the present specification can be implemented in various modes; for example, a fuel cell electricity generation unit, a fuel cell stack having a plurality of fuel cell electricity generation units, an electricity generation module having a fuel cell stack, a fuel cell system having an electricity generation module, an electrolysis cell unit, an electrolysis cell stack having a plurality of electrolysis cell units, a hydrogen generation module having an electrolysis cell stack, and a hydrogen generation system having a hydrogen generation module.

DESCRIPTION OF REFERENCE NUMERALS

Figure 1:
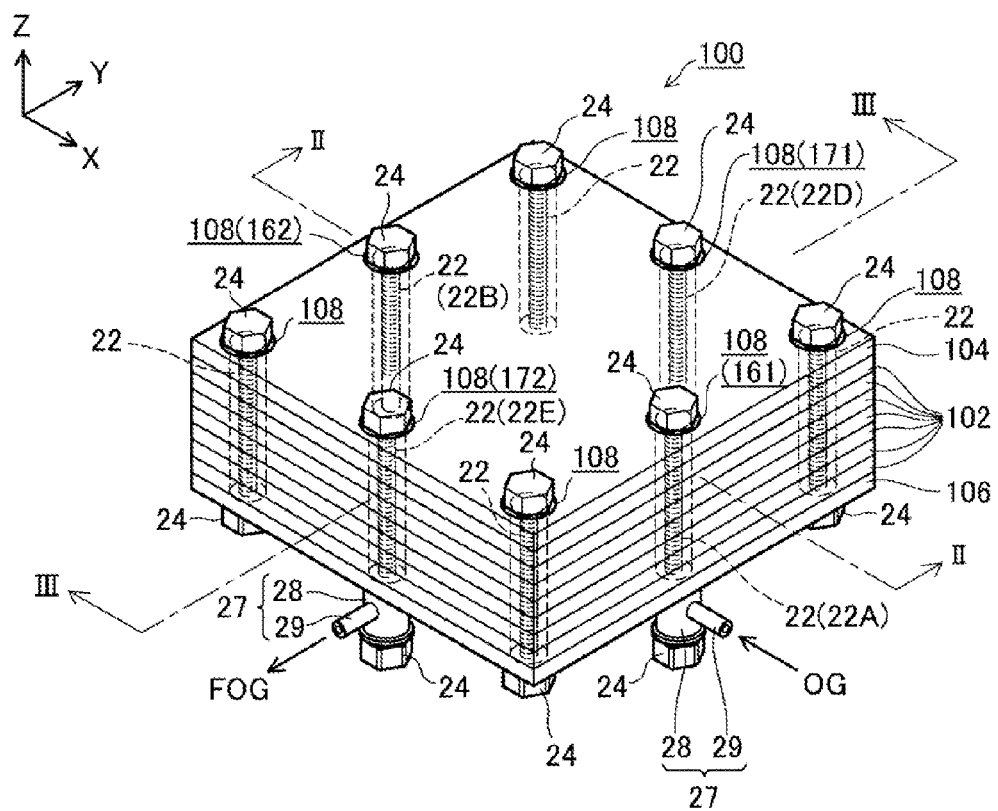
FIG. 1 is a perspective view showing the external appearance of a fuel cell stack 100 according to an embodiment of the present invention.

Reference numerals used to identify various features in the drawings include the following:
22: bolt; 24: nut; 26: insulation sheet; 27: gas passage member; 28: body portion; 29: branch portion; 100, 100c: fuel cell stack; 102, 102c: electricity generation unit; 104, 106: end plate; 108: communication hole; 110: unit cell; 112, 112c: electrolyte layer; 114, 114b, 114c: cathode; 116, 116c: anode; 120: separator; 121: hole; 124: bonding member; 130: cathode-side frame; 131: hole; 132: oxidizer gas supply communication hole; 133: oxidizer gas discharge communication hole; 134, 134b: cathode-side current collector; 135: current collector element; 135b: protrusion; 135c: current collector; 136: coat; 138, 138a, 138b, 138c: bonding layer; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150, 150b, 150c: interconnector; 161: oxidizer gas introduction manifold; 162: oxidizer gas discharge manifold; 166: air chamber; 171: fuel gas introduction manifold; 172: fuel gas discharge manifold; 176: fuel chamber; 400, 400a, 400b, 400c: bonding region; 410, 410a, 410b, 410c: block portion; 420, 420a, 420b, 420c: electrical conductivity securing portion; 510: fuel gas flow channel; 520: electrode support; and P: pore.

DETAILED DESCRIPTION OF THE PREFERRED EMBODIMENTS

The present invention will now be described in detail with reference to the drawings. However, the present invention should not be construed as being limited thereto.

A. Embodiment

A-1. Structure:
(Structure of Fuel Cell Stack 100)

Figure 2:
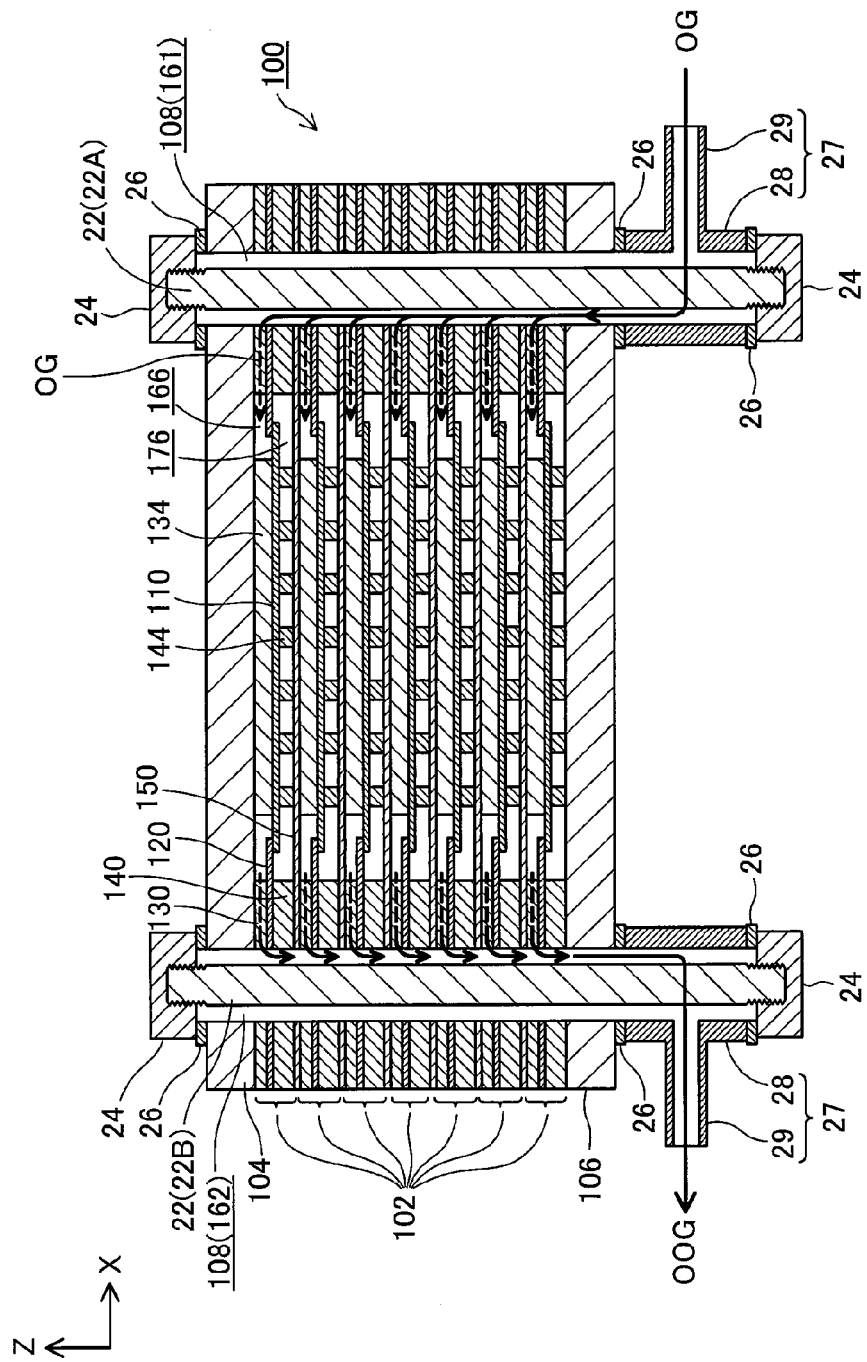
FIG. 2 is an explanatory view showing an XZ section of the fuel cell stack 100 taken along line II-II of FIG. 1.
Figure 3:
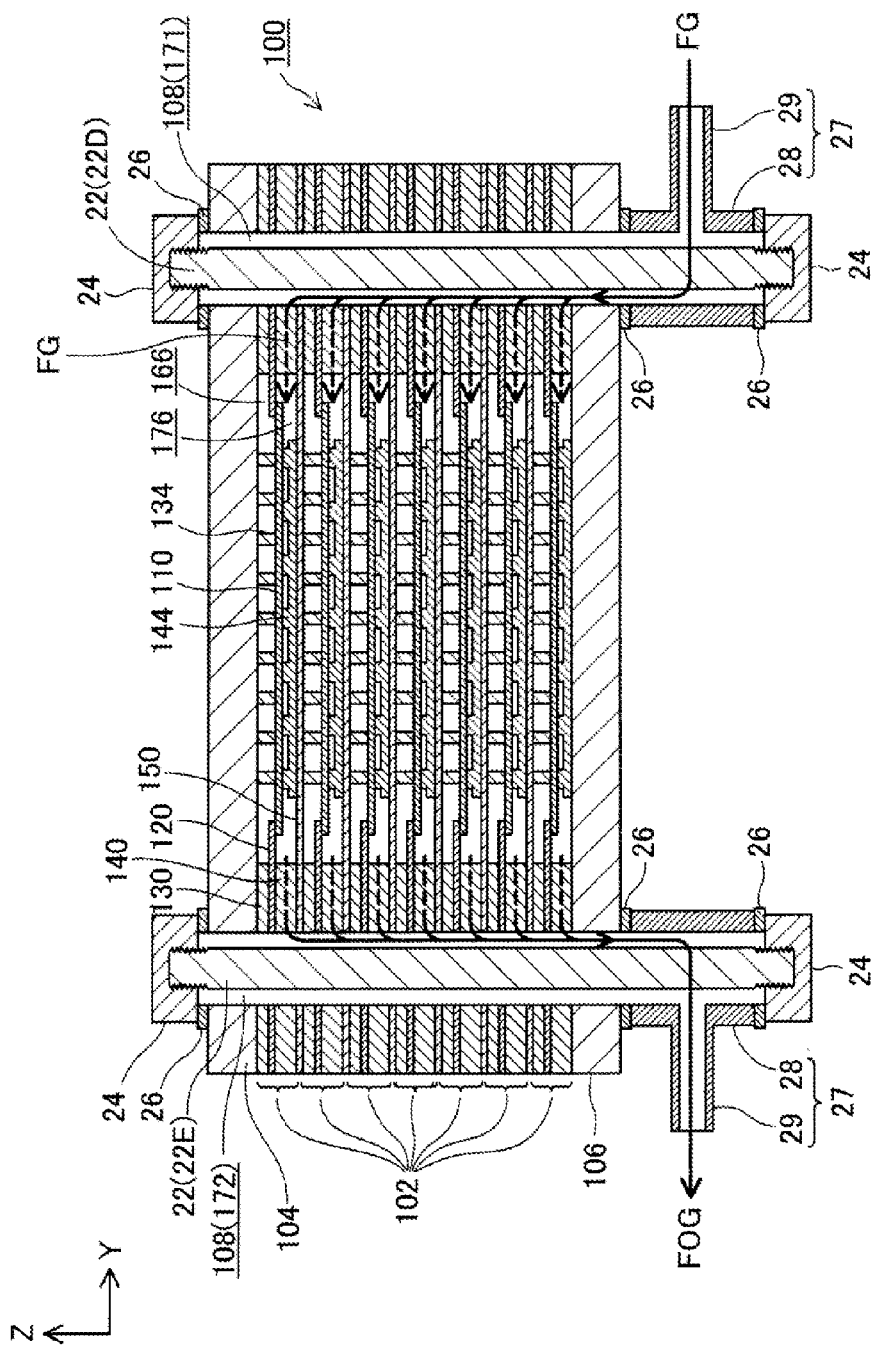
FIG. 3 is an explanatory view showing a YZ section of the fuel cell stack 100 taken along line of FIG. 1.

FIG. 1 is a perspective view showing the external appearance of a fuel cell stack 100 according to an embodiment of the present invention; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying orientation. As used herein, the positive Z-axis direction is called the upward direction, and the negative Z-axis direction is called the downward direction; however, in actuality, the fuel cell stack 100 may be disposed in a different orientation. The same also applies to FIG. 4 and subsequent drawings.

The fuel cell stack 100 includes a plurality of (seven in the present embodiment) of electricity generation units 102 and a pair of end plates 104 and 106. The seven electricity generation units 102 are disposed in a predetermined array direction (in the vertical direction in the present embodiment). A pair of the end plates 104 and 106 is disposed to hold an assembly of the seven electricity generation units 102 from the vertical direction. The array direction (vertical direction) corresponds to the first direction of the invention; a direction (a direction in the XY plane) orthogonal to the vertical direction corresponds to the second direction of the invention; and the electricity generation unit 102 corresponds to the electrochemical reaction unit and the fuel cell electricity generation of the invention.

The fuel cell stack 100 has a plurality (eight in the present embodiment) of holes formed therein and extending in the vertical direction through peripheral portions about the Z-axis direction of its component layers (the electricity generation units 102 and the end plates 104 and 106), and the corresponding holes formed in the layers communicated with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 may also be called the communication holes 108.

Bolts 22 extending in the vertical direction are inserted into the corresponding communication holes 108, and the fuel cell stack 100 is clamped by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, described below, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100. The gas introduction manifold 161 serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from air chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as an fuel gas introduction manifold 171 into which fuel gas FG is introduced from outside the fuel cell stack 100 and which supplies the fuel gas FG to the electricity generation units 102. On the other hand, a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from fuel chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having a substantially square flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
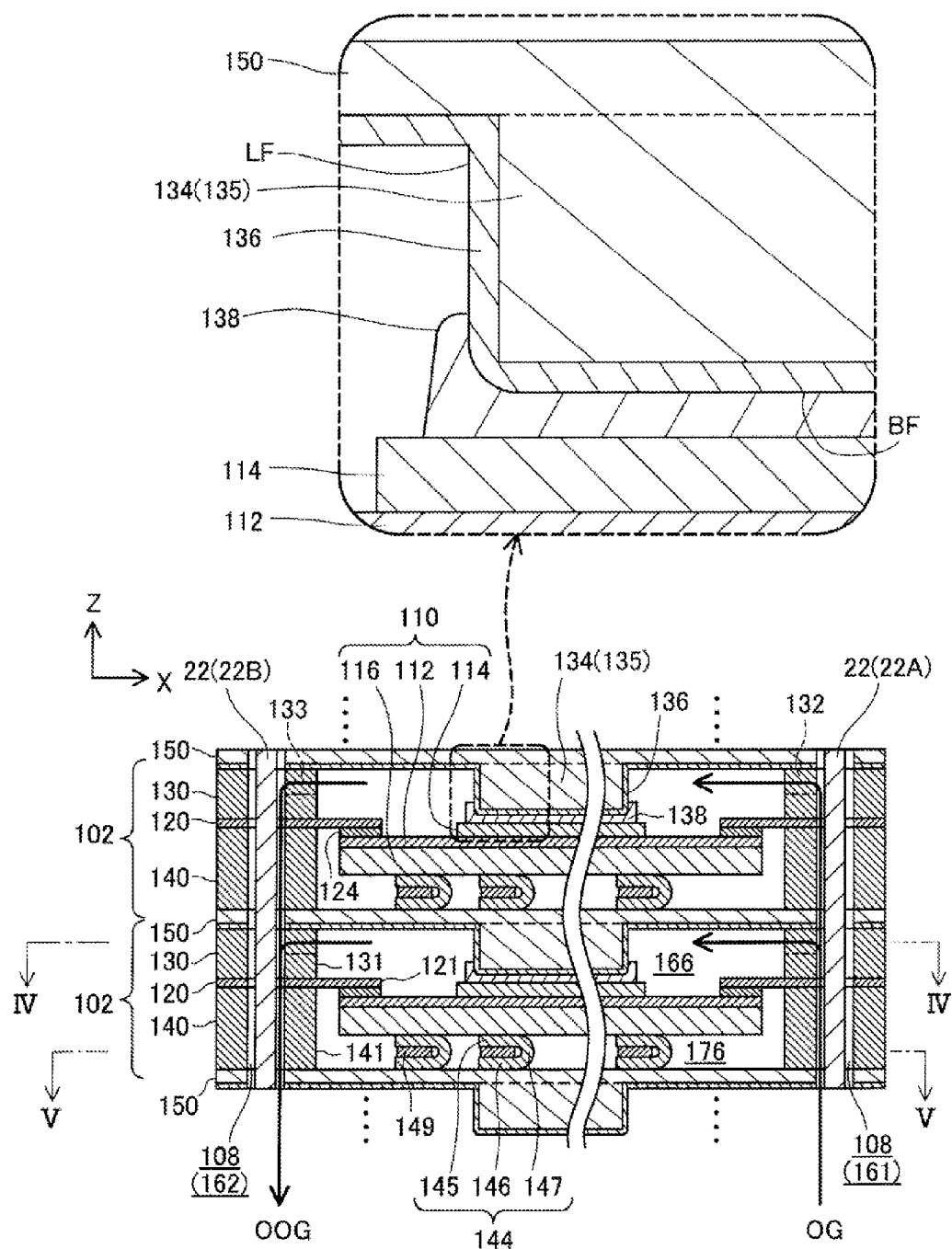
FIG. 4 is an explanatory view of the same XZ section as that of FIG. 2, showing two adjacent electricity generation units 102.
Figure 5:
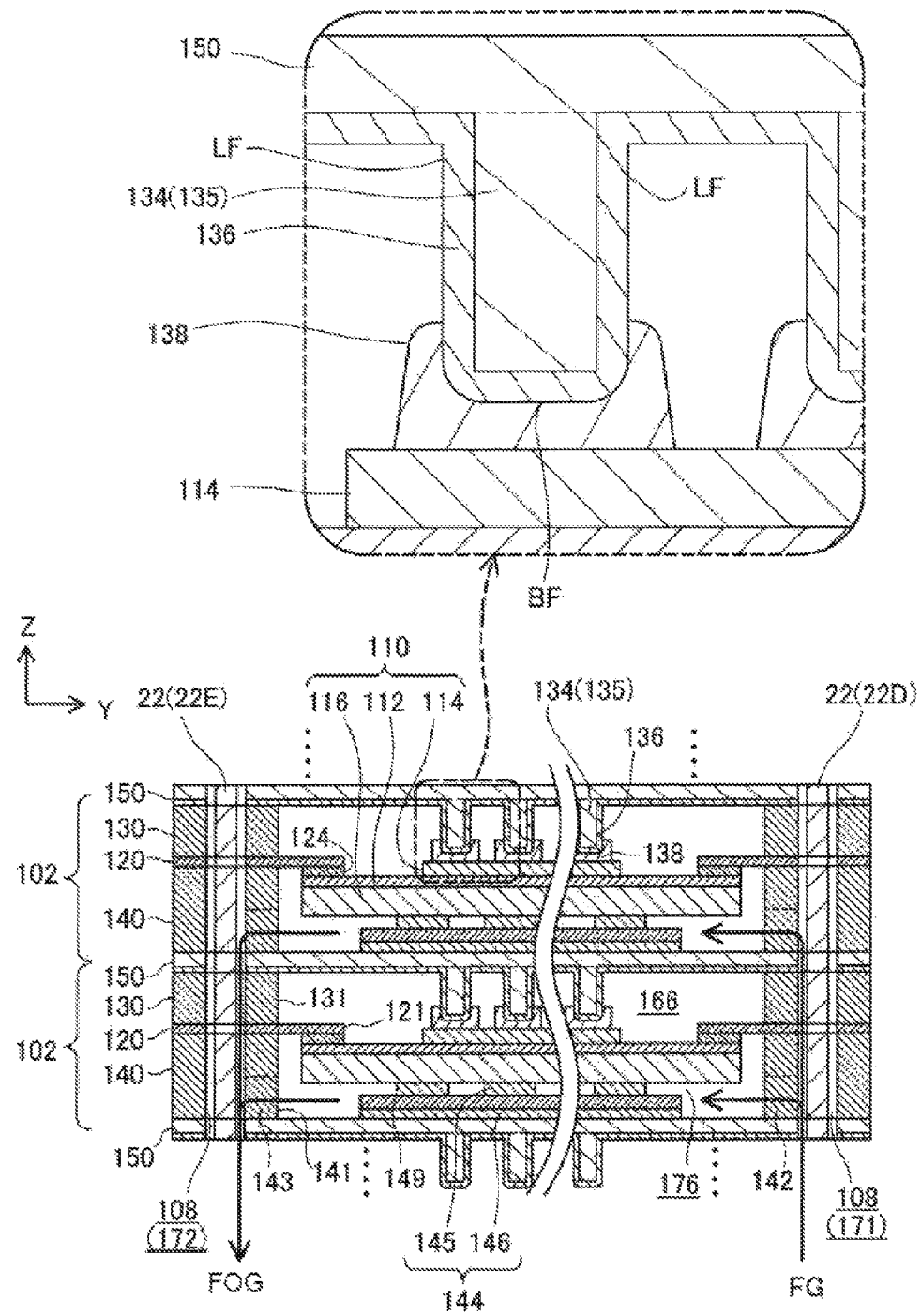
FIG. 5 is an explanatory view of the same YZ section as that of FIG. 3, showing two adjacent electricity generation units 102.

FIG. 4 is an explanatory view of the same XZ section as that of FIG. 2, showing two adjacent electricity generation units 102, and FIG. 5 is an explanatory view of the same YZ section as that of FIG. 3, showing two adjacent electricity generation units 102.

As shown in FIGS. 4 and 5, the electricity generation unit 102 serving as the smallest electricity generation unit includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having a substantially square flat-plate shape and is formed of, for example, a metal which contains Cr (chromium), such as ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a given electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The unit cell 110 includes an electrolyte layer 112, and a cathode 114 and an anode 116 which face each other in the vertical direction (an array direction of the electricity generation units 102) with the electrolyte layer 112 intervening therebetween. The unit cell 110 of the present embodiment is an anode-support-type unit cell in which the anode 116 supports the electrolyte layer 112 and the cathode 114.

The electrolyte layer 112 is a member having a substantially square flat-plate shape and is formed of a solid oxide; for example, YSZ (yttria-stabilized zirconia), ScSZ (scandia-stabilized zirconia), SDC (samarium-doped ceria), GDC (gadolinium-doped ceria), or a perovskite-type oxide. The cathode 114 is a member having a substantially square flat-plate shape and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having a substantially square flat-plate shape and is formed of, for example, Ni (nickel), a cermet of Ni and ceramic powder, or an Ni-based alloy. Thus, the unit cell 110 (electricity generation unit 102) of the present embodiment is a solid oxide fuel cell (SOFC) which uses a solid oxide as an electrolyte.

The separator 120 is a frame member which has a substantially square hole 121 formed in a central region thereof and extending therethrough in the vertical direction, and is formed of, for example, a metal. A portion of the separator 120 around the hole 121 faces a peripheral portion of the surface on the cathode 114 side of the electrolyte layer 112. The separator 120 is bonded to the electrolyte layer 112 (unit cell 110) by means of a bonding member 124 formed of a brazing material (e.g., Ag solder) and disposed between the facing portion and the electrolyte layer 112. The separator 120 separates the air chamber 166 which faces the cathode 114, and the fuel chamber 176 which faces the anode 116, from each other, to thereby restrain gas leakage from one electrode side to the other electrode side through a peripheral portion of the unit cell 110. The unit cell 110 to which the separator 120 is bonded is also called a separator-attached unit cell.

The cathode-side frame 130 is a frame member which has a substantially square hole 131 formed in a central region thereof and extending therethrough in the vertical direction, and is formed of, for example, an insulator such as mica. The hole 131 of the cathode-side frame 130 partially constitutes the air chamber 166 which faces the cathode 114. The cathode-side frame 130 is in contact with a peripheral portion of the surface on a side opposite the electrolyte layer 112 of the separator 120 and with a peripheral portion of the surface on a side toward the cathode 114 of the interconnector 150. The cathode-side frame 130 electrically insulates the two interconnectors 150 contained in the electricity generation unit 102 from each other. Also, the cathode-side frame 130 has an oxidizer gas supply communication hole 132 formed therein and adapted to establish communication between the oxidizer gas introduction manifold 161 and the air chamber 166, and an oxidizer gas discharge communication hole 133 formed therein and adapted to establish communication between the air chamber 166 and the oxidizer gas discharge manifold 162.

The anode-side frame 140 is a frame member which has a substantially square hole 141 formed in a central region thereof and extending therethrough in the vertical direction, and is formed of, for example, a metal. The hole 141 of the anode-side frame 140 partially constitutes the fuel chamber 176 which faces the anode 116. The anode-side frame 140 is in contact with a peripheral portion of the surface on a side toward the electrolyte layer 112 of the separator 120 and with a peripheral portion of the surface on a side toward the anode 116 of the interconnector 150. Also, the anode-side frame 140 has a fuel gas supply communication hole 142 formed therein and adapted to establish communication between the fuel gas introduction manifold 171 and the fuel chamber 176, and a fuel gas discharge communication hole 143 formed therein and adapted to establish communication between the fuel chamber 176 and the fuel gas discharge manifold 172.

The anode-side current collector 144 is disposed within the fuel chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface on a side opposite the electrolyte layer 112 of the anode 116, and the interconnector facing portion 146 is in contact with the surface on a side toward the anode 116 of the interconnector 150. However, as mentioned above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. As a result, the anode-side current collector 144 follows the deformation of the electricity generation unit 102 stemming from a temperature cycle and a pressure variation of reaction gas, thereby maintaining good electrical connection through the anode-side current collector 144 between the anode 116 and the interconnector 150 (or the end plate 106).

The cathode-side current collector 134 is disposed within the air chamber 166. The cathode-side current collector 134 is composed of a plurality of current collector elements 135 each having a substantially rectangular columnar shape and is formed of, for example, a metal which contains Cr (chromium), such as ferritic stainless steel. The cathode-side current collector 134 is in contact with the surface on a side opposite the electrolyte layer 112 of the cathode 114 and with the surface on a side toward the cathode 114 of the interconnector 150. However, as mentioned above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. In the present embodiment, the cathode-side current collector 134 and the interconnector 150 are integrally formed as a unitary member. That is, a flat-plate-shape portion orthogonal to the vertical direction (Z-axis direction) of the unitary member functions as the interconnector 150, and a plurality of the current collector elements 135 protruding from the flat-plate-shape portion toward the cathode 114 collectively function as the cathode-side current collector 134. The cathode-side current collector 134 or a unitary member consisting of the cathode-side current collector 134 and the interconnector 150 corresponds to the current collector of the invention. Also, the current collector elements 135 which constitute the cathode-side current collector 134 correspond to the protrusions of the invention.

As shown in FIGS. 4 and 5, the surface of the cathode-side current collector 134 is covered with an electrically conductive coat 136. The coat 136 is formed of, for example, a spinel oxide (e.g., $Mn_{1.5}Co_{1.5}O_4$, $MnCo_2O_4$, $ZnCo_2O_4$, $ZnMn_2O_4$, $ZnMnCoO_4$, or $CuMn_2O_4$). The coat 136 is formed on the surface of the cathode-side current collector 134 by a conventionally known method, such as spray coating, ink jet printing, spin coating, dip coating, plating, sputtering, or thermal spraying. As mentioned above, in the present embodiment, since the cathode-side current collector 134 and the interconnector 150 are integrally formed as a unitary member, in actuality, a surface of the cathode-side current collector 134 serving as a boundary surface between the cathode-side current collector 134 and the interconnector 150 is not covered with the coat 136, whereas a surface of the interconnector 150 which faces at least the oxidizer gas flow channel (specifically, a surface of the interconnector 150 on a side toward the cathode 114, a surface of the interconnector 150 which faces the communication hole 108 of the oxidizer gas introduction manifold 161, a surface of the interconnector 150 which faces the communication hole 108 of the oxidizer gas discharge manifold 162, etc.) is covered with the coat 136. In some cases, a chromic oxide film is formed as a result of thermal treatment on the cathode-side current collector 134. In this case, the coat 136 is not the chromic oxide film, but is a layer formed so as to cover the cathode-side current collector 134 on which the chromic oxide film is formed. In the following description, unless otherwise specified, the cathode-side current collector 134 (or the current collector element 135) means "the cathode-side current collector 134 (or the current collector element 135) covered with the coat 136."

The cathode 114 and the cathode-side current collector 134 are bonded together by an electrically conductive porous bonding layer 138. The bonding layer 138 is formed of, for example, a material which contains at least one of Zn, Mn, Co, and Cu; more specifically, a spinel oxide (e.g., $Mn_{1.5}Co_{1.5}O_4$, $MnCo_2O_4$, $ZnCo_2O_4$, $ZnMn_2O_4$, $ZnMnCoO_4$, or $CuMn_2O_4$). The bonding layer 138 is formed, for example, as follows: bonding-layer paste is applied, by printing, to portions of the surface of the cathode 114 which face respective end portions of the current collector elements 135 which constitute the cathode-side current collector 134. Then, in a state in which the end portions of the current collector elements 135 are pressed against the paste, firing is performed under predetermined conditions. The bonding layer 138 electrically connects the cathode 114 and the cathode-side current collector 134. In the previous description, the cathode-side current collector 134 is said to be in contact with the surface of the cathode 114. However, strictly speaking, the bonding layer 138 intervenes between the cathode 114 and the cathode-side current collector 134 (covered with the coat 136). In the present embodiment, the coat 136 and the bonding layer 138 are formed of respective spinel oxides which contain the same main component elements. The main component elements mean metal elements used to form a spinel oxide. A spinel oxide is identified by performing X-ray diffraction and ultimate analysis.

A-2. Operation of Fuel Cell Stack 100:

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the air chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the fuel chambers 176 through the fuel gas supply communication holes 142 of the electricity generation units 102.

When the oxidizer gas OG is supplied to the air chamber 166 of each electricity generation unit 102, whereas the fuel gas FG is supplied to the fuel chamber 176 of each electricity generation unit 102, the unit cell 110 generates electricity through the electrochemical reaction between the oxidizer gas OG and the fuel gas FG. The electricity generating reaction is an exothermic reaction. In each electricity generation unit 102, the cathode 114 of the unit cell 110 is electrically connected to one interconnector 150 through the cathode-side current collector 134 (as well as the coat 136 and the bonding layer 138), whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. Notably, in the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of the generation of electricity.

As shown in FIGS. 2 and 4, the oxidizer offgas OOG discharged from the air chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the fuel chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29. Also, a phenomenon called "Cr diffusion" is restrained in which the coat 136 which covers the surface of the cathode-side current collector 134 causes release and diffusion of Cr from the surface of the cathode-side current collector 134.

Figure 6:
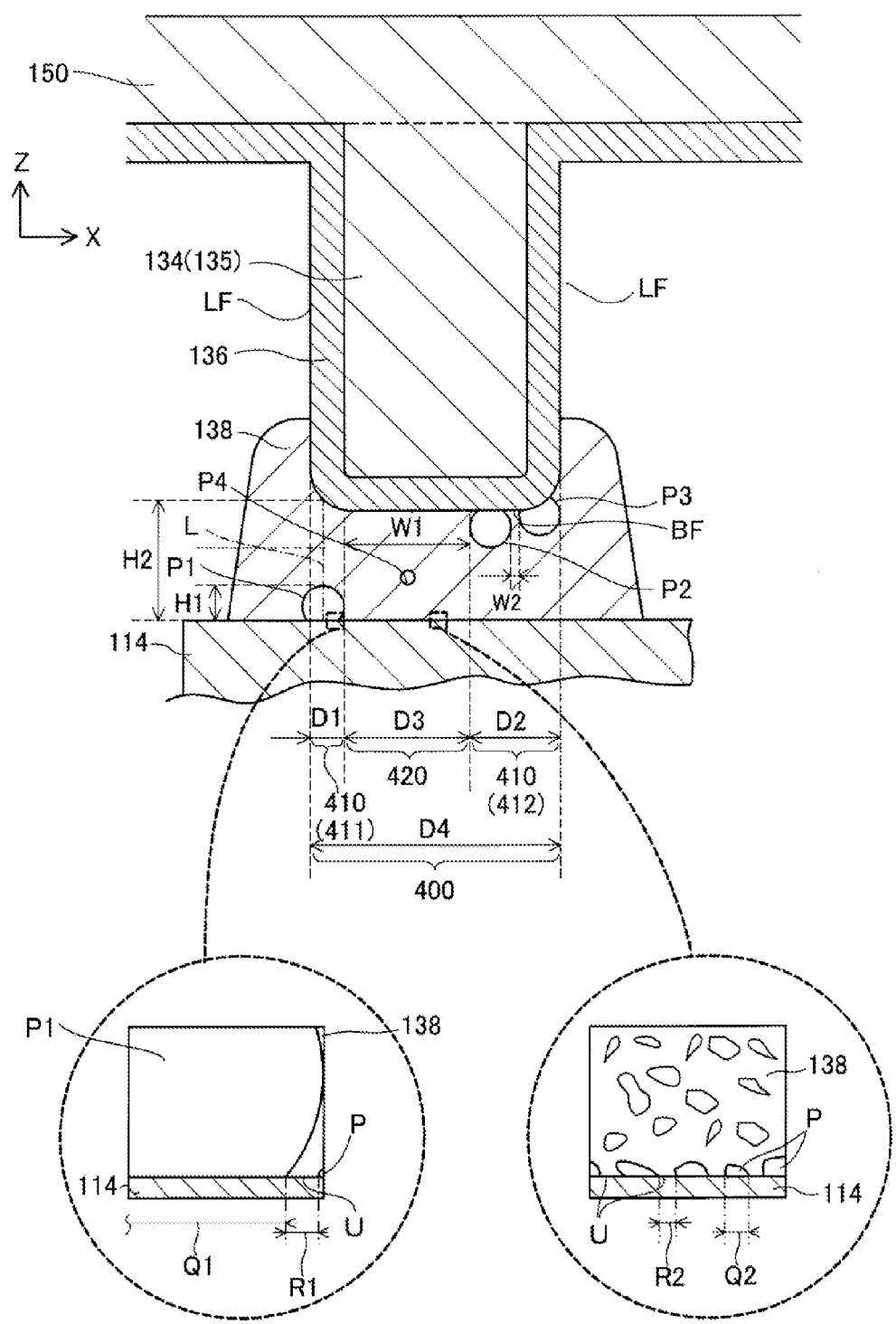
FIG. 6 is an explanatory view showing the XZ section of a cathode-side current collector 134 and a bonding layer 138.

A-3. Detailed Structure of Cathode-Side Current Collector 134 and Bonding Layer 138:

FIG. 6 shows a ZX section of the cathode-side current collector 134 and the bonding layer 138 in parallel with the vertical direction (Z-axis direction). As shown in FIGS. 2, 3, and 6, the bonding layer 138 is present in a region between the cathode 114 and the surface of each current collector element 135 which faces the cathode 114. In the present embodiment, further, the bonding layer 138 extends outward (in a direction orthogonal to the vertical direction) from an intervening region (a bonding region 400 described below) through which the cathode 114 and the current collector element 135 face each other) and extends upward along side surfaces LF of the current collector element 135 which extend from a bottom surface BF of the current collector element 135 toward a side opposite the cathode 114.

As shown in FIG. 6, in at least one section of the bonding layer 138 in parallel with the vertical direction (ZX section), the bonding region 400 of the bonding layer 138 located between the cathode 114 and all current collector elements 135 contains two block portions 410 and an electrical conductivity securing portion 420. In the XZ section of the bonding layer 138, the bonding region 400 is where the bonding layer 138 is present along the entire length of a straight line extending in the vertical direction from the cathode 114 to the current collector element 135, thereby serving as a current path between the cathode 114 and the current collector element 135. Therefore, in the present embodiment, the bonding region 400 is not the region of the entire XZ section of the bonding layer 138, but coincides with the intervening region (a portion of the region of the entire XZ section) through which the cathode 114 and the current collector element 135 face each other (a region between the extended opposite side surfaces LF of the current collector element 135), and does not include outer regions located externally in the horizontal direction of the intervening region.

The two block portions 410 are located at opposite sides of the bonding region 400 in a direction (X-axis direction, also called the horizontal direction) orthogonal to the vertical direction. In other words, in the bonding region 400, the two block portions 410 face each other in the horizontal direction with the electrical conductivity securing portion 420 intervening therebetween. Of the two block portions 410, a block portion 411 located at one end (at the negative side in the X-axis direction) of the bonding region 400 contains a pore P1 which satisfies a pore requirement and is formed on the bonding region 400 side of the interface between the cathode 114 and the bonding region 400 (bonding layer 138). The pore requirement is that a vertical diameter H1 of a pore as measured on a straight line L passing through the pore and in parallel with the vertical direction is 20% or more than a thickness H2 in the vertical direction of the bonding region 400. The block portion 411 is a portion between one of opposite ends of the bonding region 400, whichever is closer to the pore P1 (an end at the negative side in the X-axis direction), and a position which includes the pore P1 (an end of the pore P1 at the positive side in the X-axis direction). In the block portion 411, the pore P1 projects outward from one end of the block portion 411. Hereinafter, the width of the block portion 411 in the horizontal direction is denoted by D1.

Of the two block portions 410, a block portion 412 located at the other end (at the positive side in the X-axis direction) of the bonding region 400 contains pores P2 and P3 which satisfy the pore requirement and are formed on the bonding region 400 side of the interface between the cathode-side current collector 134 and the bonding region 400 (bonding layer 138). The block portion 412 is a portion between the other end of the bonding region 400 located closer to the pores P2 and P3 (an end at the positive side in the X-axis direction) and a position which includes the pores P2 and P3 (an end at the negative side in the X-axis direction of the pore P2 located closest to the central position in the horizontal direction of the bonding region 400). The block portion 412 contains the two pores P2 and P3 in their entirety. Hereinafter, the width of the block portion 412 in the horizontal direction is denoted by D2.

The overall width in the horizontal direction of the block portions 410 (the total width of the all block portions 410 (D1+D2)) is less than ½ a width D4 in the horizontal direction of the bonding region 400, more preferably, less than ¼ the width D4. The width in the horizontal direction of a single block portion 410 is less than ½ the width in the horizontal direction of the electrical conductivity securing portion 420, more preferably, less than ¼ the width in the horizontal direction of the electrical conductivity securing portion 420.

The electrical conductivity securing portion 420 is located between and adjacent to the two block portions 410. The electrical conductivity securing portion 420 does not contain a pore satisfying the pore requirement, and the average diameter of pores of the electrical conductivity securing portion 420 is smaller than that of pores (including the pores P1 to P3) of the block portion 410. As shown in FIG. 6, in the case where the bonding region 400 contains a plurality of pores satisfying the pore requirement, namely the pores P1 to P3, the electrical conductivity securing portion 420 is an inter-pore portion which has the longest distance (W1) in the horizontal direction (the greatest width in the horizontal direction) between the adjacent pores satisfying the pore requirement among a plurality of inter-pore portions each located between adjacent pores satisfying the pore requirement. Specifically, since the distance W1 between the pores P1 and P2 is longer than the distance W2 between the pores P2 and P3, the inter-pore portion between the pores P1 and P2 is the electrical conductivity securing portion 420. Hereinafter, the width in the horizontal direction of the electrical conductivity securing portion 420 is denoted by D3. Preferably, the width D3 in the horizontal direction of the electrical conductivity securing portion 420 is ½ or more the width D4 in the horizontal direction of the bonding region 400.

The bonding region 400 which contains the block portions 410 and the electrical conductivity securing portion 420 can be manufactured as follows. In manufacture of the fuel cell stack 100, bonding-layer paste to which a pore-forming material, such as resin beads, carbon, or binder, is added is applied, by printing, to regions of the surface of the cathode 114 which face the bottom surfaces BF of the current collector elements 135. Next, the applied bonding-layer paste is crushed by means of the bottom surfaces BF of the current collector elements 135 such that peripheral portions of the applied bonding-layer paste project outward from the side surfaces LF of the current collector elements 135 or extend upward along the side surfaces LF as compared with the state before crushing. As a result, pores located in a central portion of the applied bonding-layer paste are pushed outward (in a direction orthogonal to a crushing direction). In this state, firing is performed. By employing such a manufacturing method, pores satisfying the pore requirement are eliminated from inside the electrical conductivity securing portion 420 to thereby form the pores P1 to P3 satisfying the pore requirement in the block portions 410. Also, the block portions 410 can be greater in average diameter of pores than the electrical conductivity securing portion 420 located internally of the block portions 410.

A-4. Method of Analysis of Bonding Layer 138:

First, an image for analyzing the bonding layer 138; specifically, an image for analyzing pores satisfying the pore requirement and the average diameters of pores of the block portion 410 and the electrical conductivity securing portion 420, is obtained as follows. For example, a scanning electron microscope (SEM) is prepared so as to observe an image which covers the entire bonding layer 138 in the vertical and horizontal directions and which is divided into 10 horizontal segment regions such that the interface between the cathode-side current collector 134 and the bonding layer 138 is located in the top segment region and such that the interface between the bonding layer 138 and the cathode 114 is located in the bottom segment region. Then, the image is captured for use in analysis. A binarized image obtained by binarizing an image observed through the SEM may be used as the image for analysis. However, in the case where pores appearing in the binarized image differ greatly in form from actual pores, a raw image observed through the SEM may be adjusted in contrast, and the adjusted image may be binarized for use as the image for analysis. Also, a raw image observed through the SEM may be used as the image for analysis. The SEM can be set to obtain an image at 5,000 magnifications to 20,000 magnifications. A method of obtaining an image for analysis is not limited thereto, but can be modified as appropriate for obtaining an appropriate image for analysis.

Next, the average diameters of pores contained in the block portions 410 and in the electrical conductivity securing portion 420 are determined as follows. A plurality of straight lines in parallel with the vertical direction (in the present embodiment, in the Z-axis direction) are drawn on an obtained SEM image at predetermined intervals (e.g., an interval of 1 μm to 5 μm) in the horizontal direction. Pores on each straight line are measured for the lengths of line segments across the pores, and the average of the measured lengths is taken as the average value of pores on the straight line. The average values of pores on the plurality of straight lines drawn on the individual portions (the block portions 410 and the electrical conductivity securing portion 420) are averaged, thereby yielding the final average diameters of pores of the individual portions.

A-5. Effects of the Present Embodiment:

As described above, in the fuel cell stack 100 of the present embodiment, at each block portion 410 of the bonding region 400 of the bonding layer 138, at least one pore satisfying the pore requirement is formed at least on the bonding region 400 side of the interface between the cathode 114 and the bonding region 400 or on the bonding region 400 side of the interface between the cathode-side current collector 134 and the bonding region 400. As a result, as described below, the block portions 410 exhibit a function of restraining progress, to the electrical conductivity securing portion 420, of a crack generated as a result of, for example, a difference in the coefficient of thermal expansion between component members of the fuel cell stack 100.

Due to, for example, a difference in the coefficient of thermal expansion between component members of the fuel cell stack 100 such as the cathode 114 and the cathode-side current collector 134, stress is generated in the bonding layer 138. As a result, a crack progressing from the outer surface of the bonding layer 138 to the interior of the bonding layer 138 may be generated. Meanwhile, the larger the diameter of a pore formed in the bonding layer 138, the larger the area of that inner wall surface in the bonding layer 138 which defines the pore. Thus, stress generated in the bonding layer 138 can be dispersed in a greater number of directions. That is, force directed in dispersing directions can be expressed by the following formula.

Force directed in dispersing directions f=F/A
where
F: Generated stress, and
A: Area of that inner wall surface in the bonding layer 138 which defines a pore.

The above formula indicates that the larger the diameter of a pore, the larger the area of that inner wall surface in the bonding layer 138 which defines the pore. Accordingly, the smaller the force f directed in dispersing directions. This means that the larger the diameter of a pore, the higher the stress dispersibility of the pore. Also, an experiment in which the fuel cell stack 100 was operated to repeat an electricity generating operation (heat cycle) 100 times has revealed that, in the case where the pore requirement is satisfied; i.e., the diameter in the vertical direction of a pore is 20% or more than the thickness in the vertical direction of the bonding region 400, the progress of a crack in the bonding region 400 having the thickness can be ceased with a high probability. Therefore, the block portions 410 in which a pore satisfying the pore requirement is formed exhibit a function of restraining the progress of a crack from portions of the outer surface of the bonding layer 138 located near the block portions 410 to the interior of the bonding layer 138; i.e., to the electrical conductivity securing portion 420.

Also, as described above, the electrical conductivity securing portion 420 contained in the bonding region 400 of the bonding layer 138 does not contain a pore satisfying the pore requirement and is smaller in average diameter of pores than the block portions 410. As a result, as described below, the electrical conductivity securing portion 420 secures electrical conductivity between the cathode-side current collector 134 and the cathode 114.

As shown on an enlarged scale in FIG. 6, in the vicinity of the boundary (interface) between the cathode 114 and the bonding layer 138, a plurality of contact portions U where the cathode 114 and the bonding layer 138 are in contact with each other line up along the boundary with a pore P intervening therebetween. The block portion 410 contains the pore P1 satisfying the pore requirement formed on the bonding region 400 side of the interface between the cathode 114 and the bonding region 400, whereas the electrical conductivity securing portion 420 does not contain a pore satisfying the pore requirement. As a result, a width R2 in the horizontal direction of each contact portion U in the electrical conductivity securing portion 420 is narrower than a width R1 in the horizontal direction of each contact portion U in the block portion 410. Also, an interval Q2 between the contact portions U in the electrical conductivity securing portion 420 is narrower than an interval Q1 between the contact portions U in the block portion 410. As a result, in the electrical conductivity securing portion 420, as compared with the block portion 410, current which flows through each contact portion U is small. Accordingly, the magnitude of Joule heat generated in each contact portion U is small.

Therefore, in the electrical conductivity securing portion 420, as compared with the block portion 410, thermal deterioration of the cathode 114, the cathode-side current collector 134, etc., stemming from current concentration is unlikely to occur, thereby restraining deterioration in electrical conductivity between the cathode 114 and the cathode-side current collector 134. That is, the electrical conductivity securing portion 420 exhibits a function of securing electrical conductivity between the cathode-side current collector 134 and the cathode 114. As described above, according to the present embodiment, in the bonding layer 138, while the progress of a crack is restrained, electrical conductivity can be secured by restraining local current concentration in the flow of current between the bonding layer 138 and an object member of bonding. In other words, the bonding layer 138 can compatibly attain the restraint of progress of a crack and the securing of electrical conductivity.

Also, the overall width in the horizontal direction of the block portions 410 (the total width of the all block portions 410 (D1+D2)) is less than ½ the width D4 in the horizontal direction of the bonding region 400. As a result, according to the present embodiment, as compared with the case where the overall width in the horizontal direction of the block portions 410 is equal to or greater than ½ the width D4 in the horizontal direction of the boding region 400, local current concentration in the flow of current between the bonding layer 138 and an object member of bonding is restrained in the block portions 410 having a relatively large average diameter of pores, whereby the bonding layer 138 as a whole can secure high electrical conductivity.

Also, the bonding region 400 which contains the block portions 410 and the electrical conductivity securing portion 420 is formed in all the bonding layers 138 between the cathode 114 and a plurality of the current collector elements 135 which constitute the cathode-side current collector 134. As a result, as compared with a structure in which the bonding region 400 containing the block portions 410 and the electrical conductivity securing portion 420 is formed merely in the bonding layers 138 between the cathode 114 and a portion of the current collector elements 135, the bonding layer 138 as a whole can secure high electrical conductivity by means of restraining the progress of a crack and restraining local current concentration in the flow of current between the bonding layer 138 and an object member of bonding.

Further, according to the present embodiment, since, in the bonding region 400, the block portion 410 is formed on both horizontally opposite sides of the electrical conductivity securing portion 420, the progress of a crack to the electrical conductivity securing portion 420 from horizontally opposite sides can be restrained. Also, since the bonding layer 138 is formed of a spinel oxide having high electrical conductivity, local current concentration in the flow of current between the bonding layer 138 and an object member of bonding can be restrained more effectively.

B. Modifications

The technique disclosed herein is not limited to the above embodiment, but may be modified to various other forms without departing from the gist thereof. For example, the following modifications are possible.

Figure 7:
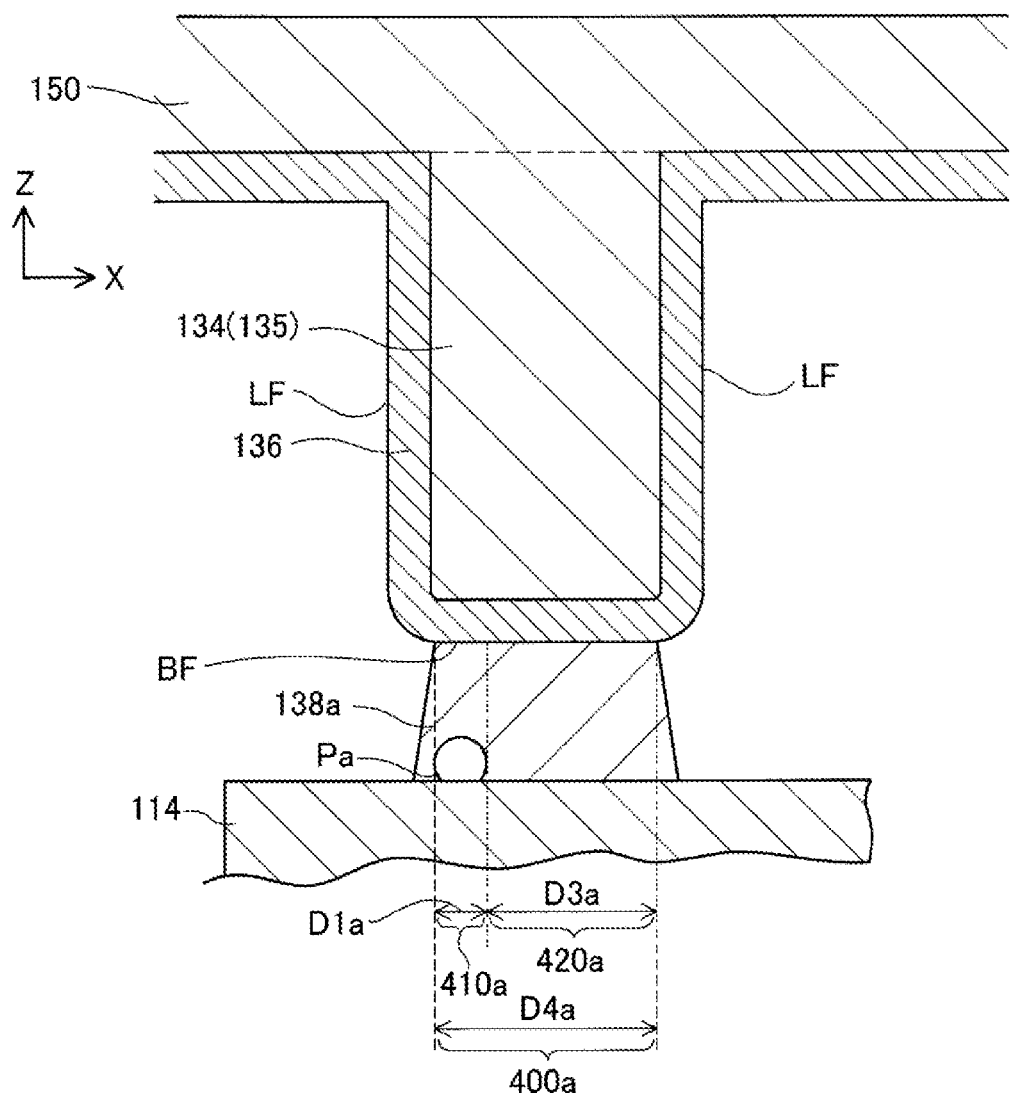
FIG. 7 is an explanatory view showing the XZ section of the cathode-side current collector 134 and a bonding layer 138a according to a first modification.

FIG. 7 shows an XZ section of the cathode-side current collector 134 and a bonding layer 138a according to a first modification. In the above embodiment, the width in the horizontal direction of the bonding layer 138 is wider than the width (distance between the opposite side surfaces LF) in the horizontal direction of the current collector element 135. However, in the present modification, as shown in FIG. 7, the width in the horizontal direction of the bonding layer 138a is narrower than the width in the horizontal direction of the current collector element 135. In such a structure, a bonding region 400a is a portion of the XZ section of the bonding layer 138a where the bonding layer 138a exists along the entire length of a straight line extending in the vertical direction from the cathode 114 to the current collector element 135, thereby serving as a current path between the cathode 114 and the current collector element 135. Therefore, in the present modification, the bonding region 400a is not the region of the entire XZ section of the bonding layer 138a, but coincides with a region intervening between the cathode 114 and the current collector element 135 and between vertical lines which pass through opposite ends of the boundary (interface) between the bonding layer 138a and the current collector element 135, and does not include outer regions located externally in the horizontal direction of the region. Notably, a width D4a in the horizontal direction of the bonding region 400a is equal to the length of the boundary.

In the present modification, the bonding region 400a has a block portion 410a which is formed only on one side (left side in FIG. 7) in the horizontal direction of an electrical conductivity securing portion 420a and in which a pore Pa satisfying the pore requirement is formed on the bonding region 400a side of an interface between the cathode 114 and the bonding region 400a. Even in such a structure, the progress of a crack from a portion of the outer surface of the bonding layer 138a located near the block portion 410a to the interior of the bonding layer 138a, i.e., to the electrical conductivity securing portion 420a, can be restrained. In the structure in which the block portion 410a is formed only on left or right side of the electrical conductivity securing portion 420a, preferably, in order to secure sufficient electrical conductivity, a width D3a in the horizontal direction of the electrical conductivity securing portion 420a is 60% or more or 75% or more the horizontal width D4a of the bonding region 400a. Meanwhile, preferably, a width D1a in the horizontal direction of the block portion 410a is less than ⅓ or less than ¼ the horizontal width D4a of the bonding region 400a.

Figure 8:
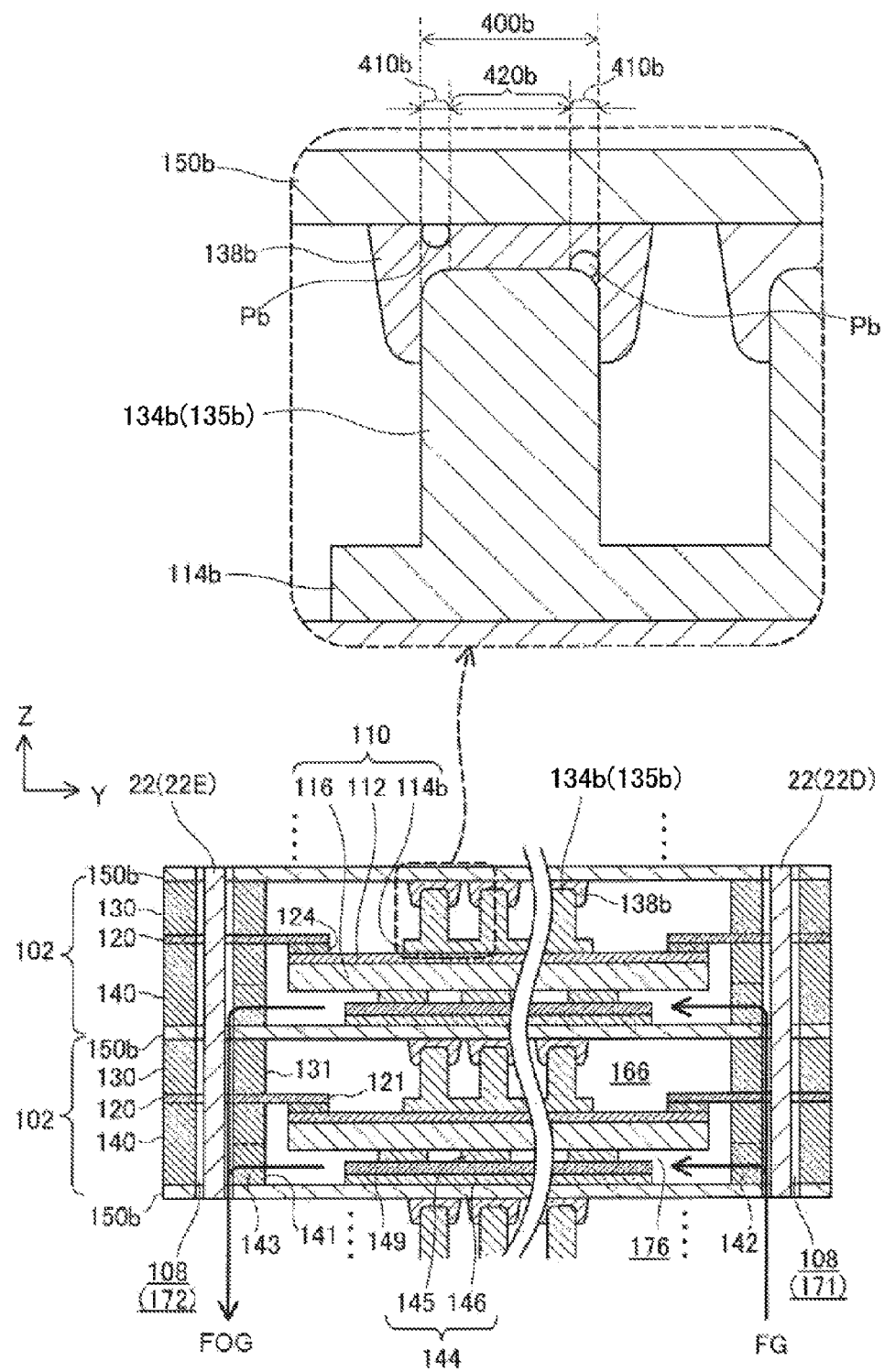
FIG. 8 is an explanatory view showing the XZ section of a cathode-side current collector 134b and a bonding layer 138b according to a second modification.

FIG. 8 shows an XZ section of a cathode-side current collector 134b and a bonding layer 138b according to a second modification. In the above embodiment, the current collector elements 135 which constitute the cathode-side current collector 134 protrude from the interconnector 150; however, in the present modification, protrusions 135b protrude from a cathode 114b toward an interconnector 150b. The protrusions 135b are formed of the same material as that of the cathode 114b, and the protrusions 135b and the cathode 114b are integrally formed as a unitary member. The bonding layer 138b bonds the protrusions 135b and the lower flat surface of the interconnector 150b together. The interconnector 150b corresponds to the current collector of the invention.

An intervening region of the bonding layer 138b through which the protrusion 135b and the interconnector 150b face each other in the vertical direction is a bonding region 400b. The bonding region 400b contains two block portions 410b in which a pore Pb satisfying the pore requirement is formed, and an electrical conductivity securing portion 420b. The two block portions 410b face each other in the horizontal direction with the electrical conductivity securing portion 420b intervening therebetween. As a result, in the bonding layer 138b, while the progress of a crack is restrained, electrical conductivity can be secured by restraining local current concentration in the flow of current between the bonding layer 138b and an object member of bonding.

Figure 9:
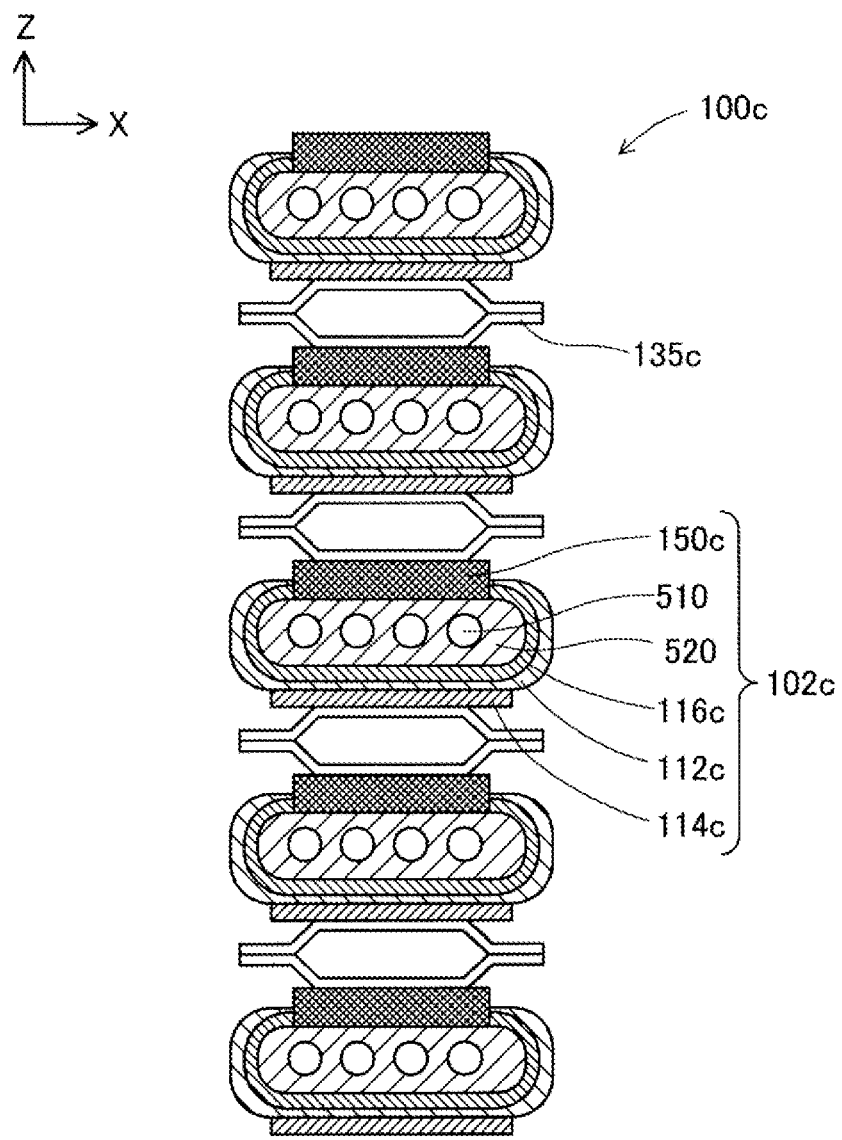
FIG. 9 is an explanatory view showing the XZ section of a fuel cell stack 100c according to a third modification.
Figure 10:
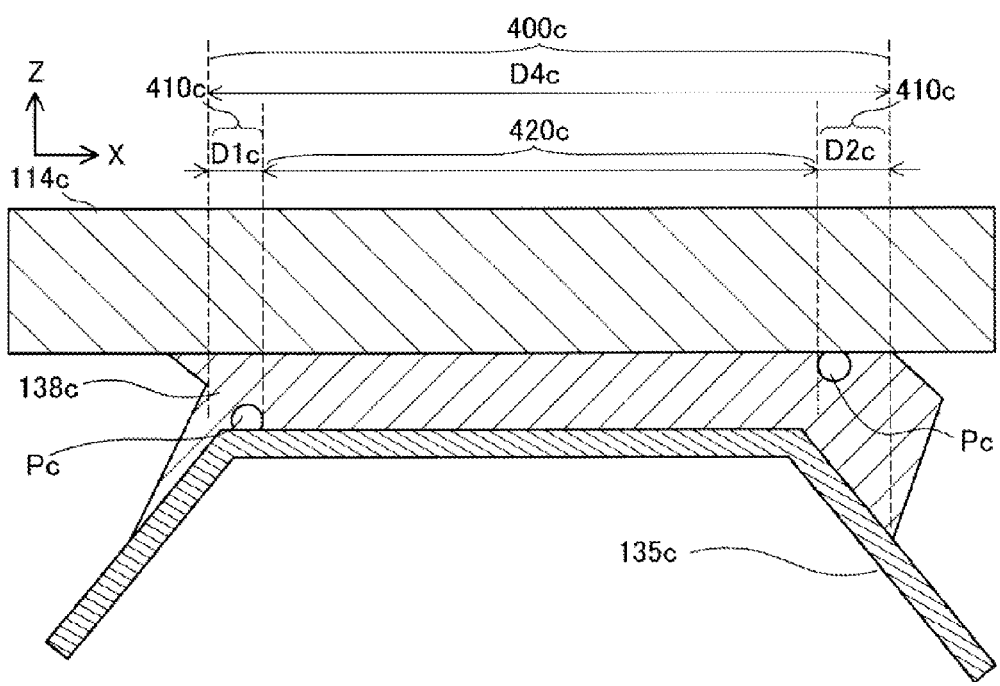
FIG. 10 is an explanatory view showing the XZ section of a current collector 135c and a bonding layer 138c according to the third modification.

FIG. 9 shows an XZ section of a fuel cell stack 100c according to a third modification, and FIG. 10 shows an XZ section of a current collector 135c and a bonding layer 138c according to the third modification. FIG. 9 eliminates an illustration of the bonding layer 138c (see FIG. 10) described below. As shown in FIG. 9, the fuel cell stack 100c of the present modification has a plurality of electricity generation units 102c which are disposed with a predetermined interval left therebetween. The plurality of electricity generation units 102c are connected electrically in series through the current collectors 135c each disposed between the adjacent electricity generation units 102c. Each electricity generation unit 102c has a flat columnar shape and includes an electrode support member 520, an anode 116c, a solid electrolyte layer 112c, a cathode 114c, and an interconnector 150c.

The electrode support member 520 is a columnar member having an elliptical section and is formed of a porous material. The electrode support member 520 has a plurality of fuel gas flow channels 510 formed therein and extending in an extending direction of the columnar member. The anode 116c covers one of two parallel flat surfaces which partially constitute the side surface of the electrode support member 520, and covers two curved surfaces which partially constitute the side surface of the electrode support member 520 and which connect end portions of the flat surfaces to each other. The solid electrolyte layer 112c covers the side surface of the anode 116c. The cathode 114c covers that portion of the side surface of the solid electrolyte layer 112c which is located on the flat surface of the electrode support member 520. The interconnector 150c is provided on the flat surface of the electrode support member 520 on which the anode 116c and the solid electrolyte layer 112c are not provided. The current collector 135c electrically connects the cathode 114c of the electricity generation unit 102c and the interconnector 150c of the adjacent electricity generation unit 102c to each other.

As shown in FIG. 10, the bonding layer 138c bonds the current collector 135c and the lower flat surface of the cathode 114c together. A bonding region 400c is between the rightmost portion of the left side wall (at the negative side in the X-axis direction) of the bonding layer 138c and the leftmost portion of the right side wall (at the positive side in the X-axis direction) of the bonding layer 138c. The bonding region 400c contains two block portions 410c in which the pore Pc satisfying the pore requirement is formed, and an electrical conductivity securing portion 420c. The two block portions 410c face each other in the horizontal direction with the electrical conductivity securing portion 420c intervening therebetween. As a result, in the bonding layer 138c, while the progress of a crack is restrained, electrical conductivity can be secured by restraining local current concentration in the flow of current between the bonding layer 138c and an object member of bonding.

In the present modification, the overall width in the horizontal direction of the two block portions 410c (=D1c+D2c) may be equal to or more than ½ the width D4c in the horizontal direction of the bonding region 400c. By employing such a structure, the progress of a crack to the electrical conductivity securing portion 420 can be restrained more effectively.

In the above embodiment, the bonding region 400 containing the block portions 410 and the electrical conductivity securing portion 420 may be formed only in the bonding layers 138 between the cathode 114 and a portion of the current collector elements 135 which constitute the cathode-side current collector 134. Preferably, the portion of the current collector elements 135 is one-half or more of all of the current collector elements 135. By employing such a structure, as compared with the case where the cathode 114 and less than half the current collector elements 135 are bonded together by the bonding layers 138 in which the bonding region 400 containing the block portions 410 and the electrical conductivity securing portion 420 is formed, while the progress of a crack is restrained, local current concentration in the flow of current between the bonding layers 138 and object members of bonding (the cathode 114 and the current collector elements 135) can be restrained.

In the above embodiment, the number of the electricity generation units 102 contained in the fuel cell stack 100 is an example only, and is determined as appropriate in accordance with a required output voltage of the fuel cell stack 100, etc.

In the above embodiment, the nut 24 is engaged with each of opposite ends of the bolt 22. However, the bolt 22 may have a head, and the nut 24 may be engaged with only an end opposite the head of the bolt 22.

In the above embodiment, the end plates 104 and 106 function as output terminals. However, other members connected respectively to the end plates 104 and 106 (e.g., electrically conductive plates disposed respectively between the end plate 104 and the electricity generation unit 102 and between the end plate 106 and the electricity generation unit 102) may function as output terminals.

In the above embodiment, spaces between the outer circumferential surfaces of shaft portions of the bolts 22 and the inner circumferential surfaces of the communication holes 108 are utilized as manifolds. However, axial holes may be formed in the shaft portions of the bolts 22 for use as the manifolds. Also, the manifolds may be provided separately from the communication holes 108 into which the bolts 22 are inserted.

In the above embodiment, in the case where two electricity generation units 102 are disposed adjacent to each other, the adjacent two electricity generation units 102 share a single interconnector 150. However, even in such a case, two electricity generation units 102 may have respective interconnectors 150. Also, in the above embodiment, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided and need to be eliminated.

In the above embodiment, the cathode-side current collector 134 and the interconnector 150 located adjacent thereto are integrally formed as a unitary member. However, they may also be formed as separate members. Also, in the above embodiment, the anode-side current collector 144 may have a structure similar to that of the cathode-side current collector 134, i.e., the anode-side current collector 144 and the adjacent interconnector 150 may be integrally formed as a unitary member. The anode-side frame 140 rather than the cathode-side frame 130 may be an insulator. Also, the cathode-side frame 130 and the anode-side frame 140 may have a multilayer structure.

In the above embodiments, materials used to form the members are provided by way of example only. Other materials may be used to form the members. For example, in the above embodiment, the cathode-side current collector 134 is formed of a metal which contains Cr. However, the cathode-side current collector 134 may be formed of another material so long as the cathode-side current collector 134 is covered with the coat 136. Also, the shape of each current collector element 135 of the cathode-side current collector 134 is not limited to a rectangular columnar shape, but may assume another shape so long as each current collector element 135 protrudes toward the cathode 114 from the interconnector 150 side.

In the above embodiment, the coat 136 and the bonding layer 138 are formed of respective spinel oxides which contain the same main component elements. However, the coat 136 and the bonding layer 138 may be formed of respective spinel oxides which differ in main component elements. Also, in the above embodiment, the coat 136 and the bonding layer 138 are formed of respective spinel oxides which contain at least one of Zn and Mn and at least one of Co and Cu. However, the coat 136 and the bonding layer 138 may be formed of respective spinel oxides which do not contain these elements. In the above embodiment, the coat 136 and the bonding layer 138 are formed of respective spinel oxides. However, the coat 136 and the bonding layer 138 may be formed of other materials, such as perovskite-type oxides, etc. In the case where the current collector is formed of a material that does not suffer from Cr diffusion or a like problem, the current collector may not be covered with a coat.

In the above embodiment, the hydrogen-rich fuel gas FG is obtained by reforming city gas. However, the fuel gas FG may be obtained from other materials, such as LP gas, kerosene, methanol, and gasoline, or pure hydrogen may be utilized as the fuel gas FG.

In the present specification, a structure in which a member (or a certain portion of the member; the same also applies in the following description) B and a member C face each other with a member A intervening therebetween" is not limited to a structure in which the member A is adjacent to the member B or the member C, but includes a structure in which another component element intervenes between the member A and the member B or between the member A and the member C. For example, a structure in which another layer intervenes between the electrolyte layer 112 and the cathode 114 can be a structure in which the cathode 114 and the anode 116 face each other with the electrolyte layer 112 intervening therebetween.

In the above embodiment (or the above modifications; the same also applies in the following description), all of the electricity generation units 102 contained in the fuel cell stack 100 have a structure in which the bonding region 400 of the bonding layer 138 contains the block portion 410 and the electrical conductivity securing portion 420. However, if at least one of the electricity generation units 102 contained in the fuel cell stack 100 has such a structure, an effect of compatibly restraining the progress of a crack and securing electrical conductivity can be obtained.

The above embodiment refers to SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2014-207120, a detailed description thereof is omitted, but schematically, the electrolysis cell stack has a structure similar to that of the fuel cell stack 100 in the above embodiment. That is, the fuel cell stack 100 in the above embodiment may interchangeably be an "electrolysis cell stack," and the electricity generation unit 102 may interchangeably be an "electrolysis cell unit." However, in operation of the electrolysis cell stack, a voltage is applied between the cathode 114 and the anode 116 such that the cathode 114 is a positive electrode (anode), whereas the anode 116 is a negative electrode (cathode), and water vapor is supplied as material gas through the communication hole 108. As a result, the electrolysis of water occurs in the electrolysis cell units, whereby hydrogen gas is generated in the fuel chambers 176, and hydrogen is discharged to the outside of the electrolysis cell stack through the communication hole 108. Even in the electrolysis cell unit and the electrolysis cell stack having the above structures, similar to the above embodiment, by employing a structure in which the bonding region of the bonding layer contains the block portion and the electrical conductivity securing portion, an effect of compatibly retraining the progress of a crack and securing electrical conductivity can be obtained.

The above embodiment is described while referring to the solid oxide fuel cell (SOFC); however, the present invention is also applicable to other types of fuel cells (or electrolysis cells), such as a polymer electrolyte fuel cell (PEFC), a phosphoric-acid fuel cell (PAFC), and a molten carbonate fuel cell (MCFC).

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application Nos. 2015-123586 filed Jun. 19, 2015, incorporated herein by reference in its entirety.

What is claimed is:

1. An electrochemical reaction unit comprising
   a unit cell including an electrolyte layer containing a solid oxide, and a cathode and an anode which face each other in a first direction with the electrolyte layer intervening therebetween;
   a current collector disposed on a cathode side of the unit cell; and
   an electrically conductive porous bonding layer which bonds the current collector and the cathode together;
   wherein, in at least one section of the bonding layer in parallel with the first direction, a bonding region located between the current collector and the cathode contains
   a block portion in which at least one pore satisfying a pore requirement of a diameter in the first direction being 20% or more than a thickness of the bonding region in the first direction is formed on at least a bonding region side of an interface between the cathode and the bonding region or on a bonding region side of an interface between the current collector and the bonding region, the block portion extending inward from one of opposite ends in a second direction orthogonal to the first direction of the bonding region, whichever is closer to the pore satisfying the pore requirement, and reaching and containing the pore satisfying the pore requirement, and
   an electrical conductivity securing portion which is located toward the other end of the bonding region with respect to the block portion and which is smaller in average diameter of pores than the block portion,
   wherein a region of the current collector which is in contact with the bonding region is flat.

2. The electrochemical reaction unit as claimed in claim 1, wherein, in the at least one section, an overall width in the second direction of the block portions is less than ½ a width in the second direction of the bonding region.

3. The electrochemical reaction unit as claimed in claim 1, wherein
   the current collector has a plurality of protrusions protruding toward the cathode, and
   the cathode and at least half of the plurality of protrusions are bonded together by the bonding layer.

4. The electrochemical reaction unit as claimed in claim 1, wherein
   the current collector has a plurality of protrusions protruding toward the cathode, and
   the cathode and all of the plurality of protrusions are bonded together by the bonding layer.

5. The electrochemical reaction unit as claimed in claim 1, wherein, in the at least one section, the block portion is formed on each of opposite sides in the second direction of the electrical conductivity securing portion.

6. The electrochemical reaction unit as claimed in claim 1, wherein the bonding layer is formed of a spinel oxide.

7. A fuel cell electricity generation unit for generating electricity comprising the electrochemical reaction unit as claimed in claim 1.

8. A fuel cell stack comprising a plurality of fuel cell electricity generation units,
   wherein at least one of the plurality of fuel cell electricity generation units is the electrochemical reaction unit as claimed in claim 1.

* * * * *